DEVICE FOR THE TESTING OF REPEATERS
Filed July 3, 1956 2 Sheets-Sheet 1
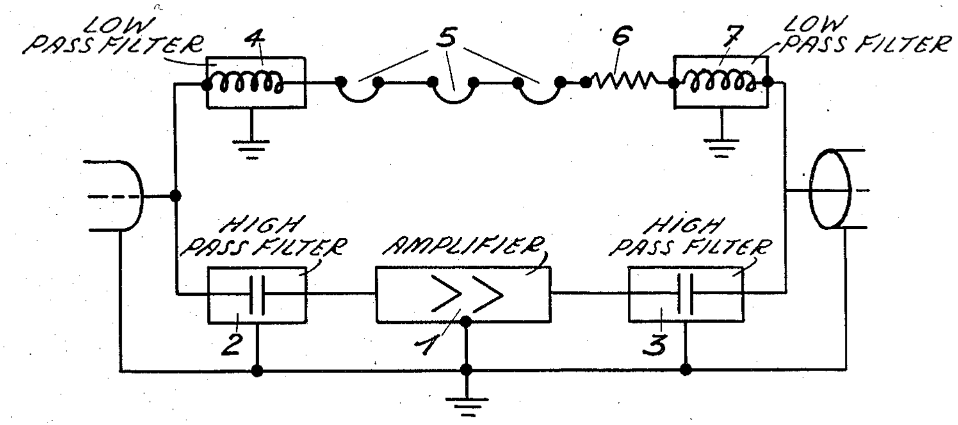
Fig: 1
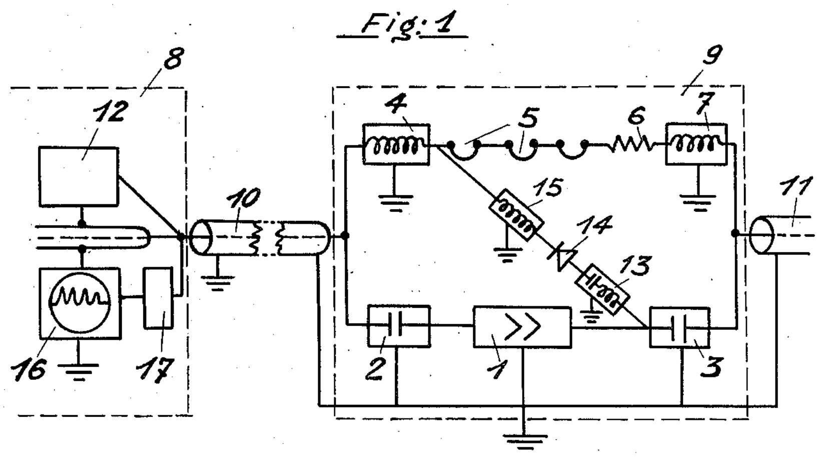
Fig. 2
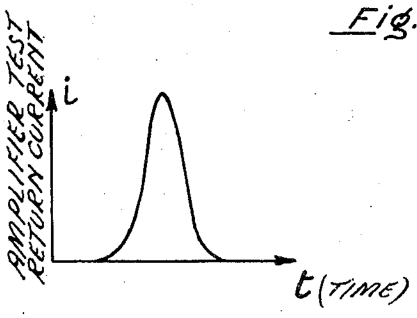
Fig: 3
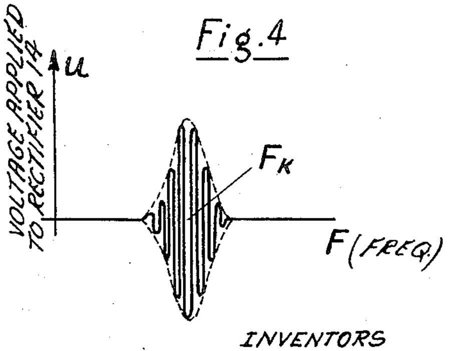
INVENTORS
ANDRE PONTHUS
AND GEORGES COMTE
BY Paul M. Craig, Jr.
ATTORNEY.

DEVICE FOR THE TESTING OF REPEATERS

INVENTORS
ANDRE PONTHUS & GEORGES COMTE
BY Paul M. Craig, Jr.
ATTORNEY.

2,890,296

Patented June 9, 1959

2,890,296

DEVICE FOR THE TESTING OF REPEATERS

André Ponthus and Georges Comte, Lyon, France, assignors to Compagnie Generale d'Electricite, Paris, France, a corporation of France Application July 3, 1956, Serial No. 595,795

3 Claims. (Cl. 179—175.31)

Figure 5:
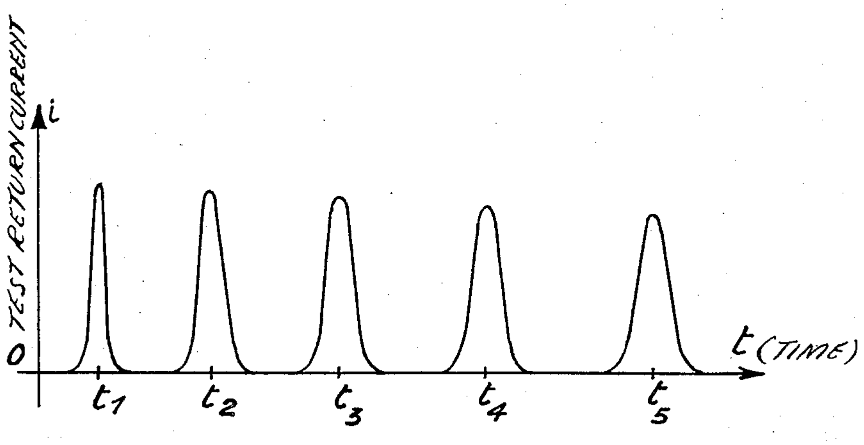

When a long distance transmission line equipped with remote controlled repeaters, power-supplied through the line itself is put out of action by the failure of one repeater, it is indispensable to determine the location of the faulty repeater in order to repair it; in case the line has been laid either at sea or in area difficult of access, this determination should be practicable from one end of the line, without any access to any intermediate point on account of the high costs for raising and opening the cable.

An intermediate repeater on a line with a remote power supply always comprises a system of filters which make it possible to separate the telephone currents which are to be amplified from the direct current intended for the power supply of the repeater. A typical embodiment of this filter system is represented in Figure 1, which is applicable to a repeater amplifying only one way (from left to right). In Figure 1, reference numeral 1 designates the amplifier used for compensating the attenuation of telephone currents, 2 and 3 designate high pass filters which allow telephone currents to flow into and out of the repeater while stopping power supply currents, 4 and 7 are low pass filters which allow a D.C. power supply to flow through the filaments 5 of the amplifier tubes connected in series and a resistance 6 which creates a voltage drop necessary for the anode supply to the tubes.

The device according to the present invention makes it possible to carry out, from the end of a line, the testing of each one of the repeaters, in accordance with Figure 1, without stopping the operation of the line, and to locate a faulty repeater if any. This testing is carried out by sending from the input to the line, an exploration signal comprised in the band of frequencies amplified by the repeater and having a different middle or center frequency for each repeater, this signal giving rise, at the receiving end, at the input to the line, to a return signal from the repeater under test, transmitted in the direct current band reserved for the remote power supply of the repeaters.

It is the amplitude of this return signal which gives information as to the condition of operation of each repeater.

A testing device of this type is known, for instance, from French Patent 1,087,427 in which a frequency modulated exploration signal is sent over the line from a terminal station. A locating system is also known, for instance from French Patents 791,198 and 981,001, in which a particular frequency is assigned to each repeater in an unattended station, these particular frequencies being put in evidence by means of circuits comprising filters and rectifiers. In the system according to Patent 791,198 however, discrete frequencies are used, and, in Patent 981,001 no indication is given as to the exploration signal used and the circuits assigned to locating in repeaters differ little from those which are the object of our invention.

The device according to the latter, designed for use in a locating system comprising, in a terminal station, a generator delivering a frequency modulated test current, is characterized by the fact that it comprises, between the output of the amplifier and the input end of the chain of filaments of the amplifier, the assembly, in series, of a highly selective resonator tuned to a frequency within the band of frequencies delivered by the generator, of a rectifier transforming the oscillations transmitted by the resonator into a low frequency current and of a low pass filter allowing this current to return towards the entrance to the line and finally, at the entrance to the line, an element such as an oscilloscope making it possible to observe the levels of the low frequency currents from the various repeaters.

Figure 6:
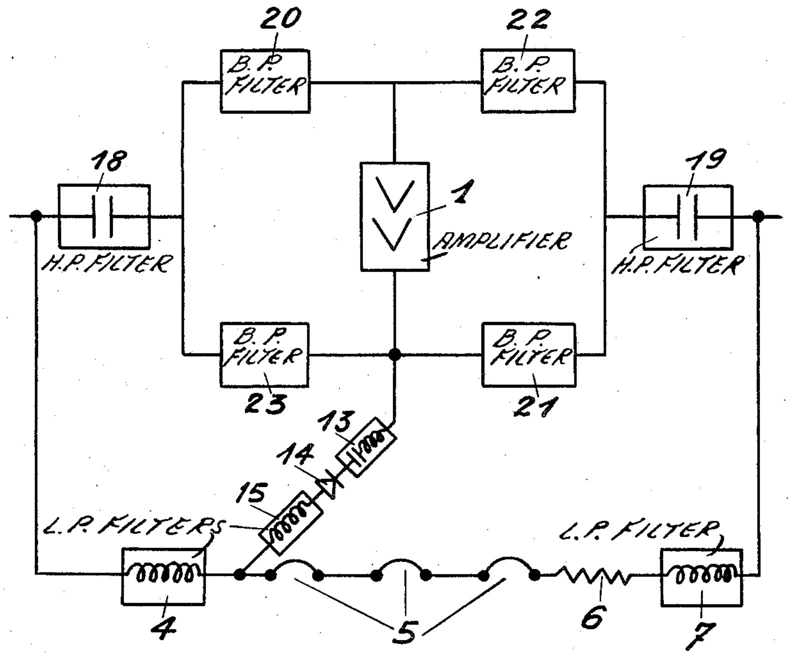

Figure 2 shows, schematically, the device according to the invention, Figures 3, 4 and 5 are diagrams illustrating the operation of the device according to Figure 2 and Figure 6 represents a modified embodiment of this device.

In Figure 2, reference numeral 8 designates the terminal station of the installation, 9 is a first repeater, 10 the section of coaxial line between 8 and 9 and 11 is a section of coaxial line to a second repeater not shown.

In the terminal station 8, reference numeral 12 designates a generator which generates signals, the frequency of which is modulated about a mean frequency $F_k$, between two extreme limits $F_1$ and $F_2$ at a rhythm $f$ of a few cycles or tens of cycles per second; the difference between the frequencies $F_1$ and $F_2$ does not exceed a few hundred cycles per second, about $F_k$ and these two frequencies being inside the band effectively amplified by the repeater, preferably in a range specially provided for these tests, so as not to interfere with the normal operation of the line.

In addition to the elements of the repeater 9 already shown in Figure 1, there is added, between the output of the amplifier 1 and the output from the filter 4 the assembly of a resonator 13, a rectifier 14 and a low pass filter 15.

The resonator 13 has been chosen very selective, preferably of the quartz crystal type, and it is so designed that its impedance is low at the resonance frequency $F_k$ but becomes very large on both sides of that frequency, even for frequency deviations of the order of a few cycles per second about $F_k$; the rectifier 14 is a dry rectifier of any type whatsoever; the low pass filter 15 is built so as to pass only a band of frequencies lower than those which are capable of passing through the high pass filters 2 and 3 and of being amplified by the amplifier 1.

For each repeater in the installation, a different tuning frequency for the resonator 13 is chosen; the tuning frequencies for the successive repeaters are distant from one another by a few hundred cycles per second, so that the test signal sent on one of these frequencies from the input to the line excites only the resonator of one repeater at a time; it is sufficient, for this, that the excursion in frequency of the voltage supplied by the generator 12 be sufficiently low and that the middle frequency be chosen equal to the frequency $F_k$ of the repeater to be tested; when the instantaneous frequency of the exploration signal transmitted over the line and amplified by the repeater 1 passes in the immediate vicinity of the frequency $F_k$, the impedance of the resonator 13 is sufficiently low to allow the passing of an important portion of the energy of that signal, which is rectified by the rectifier 14, the low frequency current resulting from this rectification goes through the low pass filter 15 and, dividing into two halves, it is propagated over the line, on the right and on the left of the repeater after passing through the filters 4 and 7. It is easy to observe the wave shape of this current at its arrival at one end of the line, by means of an oscilloscope 16 or a sufficiently sensitive recorder preceded by a low-pass filter 17 as it has been able to pass without any hindrance all the repeaters located between the repeater under test and the end of the line, by passing through the low frequency channel provided for the remote control of the repeaters. The wave shape of this current may be represented, as a function of time by Figure 3 which shows one period of this current; the voltage applied to the rectifier 14 through the resonator 13 assumes, as a function of the instantaneous frequency of the exploration signal, the shape represented in Figure 4.

From the maximum amplitude of the current represented by Figure 3 it is possible to check whether the amplification of the repeaters of ranks 1, 2, . . . K up to and including K is normal; by carrying out this test for each repeater, by changing the central exploration frequency, without changing the width of the frequency band explored, it is possible to know separately the amplitude of the maximum current at the output of each repeater; if, on the contrary, a frequency band $n$ times larger is explored, $n$ being the total number of repeaters in the installation, without changing the exploration speed as a function of time, a sequence of current peaks is observed, more and more distant from one another as the measuring station receives return currents from repeaters more distant from the origin, as shown in Figure 5. If the voltage sent back by repeater No. 1 goes through a maximum at instant $t_1$, that from repeater No. 2, in turn, goes through a maximum at instant $t_2$ and so on; if the repeater of rank K is damaged and does not amplify any longer, its return voltage will be absent as well as that from the repeaters which follow, which will make it possible to localize the fault; this test assumes, of course, that in spite of the failure of repeater K the power supply current continues to flow on the line, from end to end; it is possible to take a number of known precautions for ensuring the permanency of the remote power supply, for instance by short-circuiting by a relay or a gas discharge tube, the filaments of the tubes which might be broken.

In the description of the device according to the invention, no mention has been made, so far, of any application except to a one way repeater, for a line transmitting talking only in one direction. This device is also applicable, with no modification, to both transmission directions of a line with two-way transmission, distributed into two frequency bands which are separated at each repeater by directional filters, the same repeater thus being capable of amplifying the two directions of transmission.

Figure 6 shows such an arrangement; there may be seen, in this figure, the amplifier proper 1 and high pass filters 18 and 19 which separate the telephone currents from the power supply currents the latter going through the low pass filters 4 and 7, the filaments 5 of the tubes, connected in series, and the resistance 6; the two directions of transmission of the telephone currents are separated in a known manner by a system of band pass filters, the filters 20 and 21 allowing the passing through the amplifier of the lower telephone band, while the filters 22 and 23 allow the passing of the upper band which is transmitted over the line in the other direction; the assembly of the resonator 13, of the rectifier 14 and of the low pass filter 15 is connected, as in the set-up according to Figure 2, between the output from the amplifier 1 and the output from the filter 4 located on the entrance side of the filaments 5 of the tubes. A second, similar assembly may be used for the other direction of transmission, by using a resonator tuned to a frequency within the upper frequency band.

What is claimed is:

1. A device for testing repeaters which are supplied with power from a distance and which are connected in series along a transmission line, designed for use in a fault-locating system, comprising, at a terminal station, a generator delivering a frequency modulated test current, each repeater including amplifier means having an input, and an output and filament means for said amplifier means connected in series, and a series circuit including a highly selective resonator tuned to a frequency within a band of frequencies delivered by said generator, a rectifier for transforming the oscillations transmitted by said resonator into low frequency currents and a low-pass filter enabling said low frequency currents to return toward the entrance of the line, said series circuit being connected between the output of said amplifier means and the input end of said series connected filament means, and means at the entrance to the line for observing the levels of the low frequency currents returning from the various repeaters to determine the location of any fault along said line.

2. A device according to claim 1 wherein each repeater includes two parallel circuits, one of said parallel circuits comprising said amplifier means including high pass filter means, and another of said parallel circuits comprising said filament means including low pass filter means.

3. A device according to claim 2 wherein said one parallel circuit is subdivided into two parallel branches to provide a two-way repeater amplifier system.

References Cited in the file of this patent

UNITED STATES PATENTS

| | | |
|---|---|---|
| 2,315,434 | Leibe | Mar. 30, 1943 |
| 2,550,782 | Cooper | May 1, 1951 |
| 2,564,010 | Jacobs | Aug. 14, 1951 |
| 2,580,097 | Ilgenfritz et al. | Dec. 25, 1951 |

FOREIGN PATENTS

| | | |
|---|---|---|
| 656,188 | Great Britain | Aug. 15, 1951 |